United States Patent [19]

Moser et al.

[11] 4,221,350

[45] Sep. 9, 1980

[54] AUTOMATIC DIRECTION STABILIZATION SYSTEM

[75] Inventors: Werner Moser, Munich; Volker V. Tein, Ottobrunn; Albert Dirlewanger, Gauting; Hans Offenbeck, Ottobrunn; Walter Stoeckle, Munich, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 850,904

[22] Filed: Nov. 14, 1977

[30] Foreign Application Priority Data

Nov. 17, 1976 [DE] Fed. Rep. of Germany ....... 2652289

[51] Int. Cl.² .......................................... B64C 25/50
[52] U.S. Cl. ................................... 244/50; 244/103 W
[58] Field of Search .............. 244/50, 79, 111, 103 W, 244/179, 184, 196, 197; 180/103 BF, 141, 280; 114/275; 318/586

[56] References Cited

U.S. PATENT DOCUMENTS

| 2,953,323 | 9/1960 | Minch | 244/50 |
| 3,711,042 | 1/1973 | Rempfer | 244/179 |
| 3,823,899 | 7/1974 | Currey | 244/103 W |
| 3,919,961 | 11/1975 | McDougal | 244/50 |
| 4,006,870 | 2/1977 | Boone | 244/184 |
| 4,008,868 | 2/1977 | Berg | 244/50 |

*Primary Examiner*—Trygve M. Blix
*Assistant Examiner*—Reinhard J. Eisenzopf
*Attorney, Agent, or Firm*—W. G. Fasse; D. F. Gould

[57] ABSTRACT

The present system automatically stabilizes the travel direction of an aircraft rolling out after touchdown on a runway. A corrected difference control signal is supplied to the steering mechanisms of the aircraft, including, if desired, the brake system. The control signal is generated in a comparator or transducer which receives at its inputs an actually measured signal representing changes in the travel direction of an aircraft, and a rated signal to produce a combined steering signal which is supplied to the nose wheel steering and/or to the wheel brakes.

8 Claims, 2 Drawing Figures

AUTOMATIC DIRECTION STABILIZATION SYSTEM

BACKGROUND OF THE INVENTION

The present invention relates to an automatic direction stabilization system for aircraft rolling on the ground, especially rolling out after touchdowns.

Aircraft rolling out after touchdown may be subject to swerving moments about the yaw axis resulting from diverse causes. Such swerving moments may be effective while the aircraft is on a straight run or while it makes a turn. Such possibly uncontrollable perturbations could be caused by cross winds or gusts, for example. Aircrafts employimg thrust reversal may also be subject to such perturbations because the thrust reversal may cause a strong turbulence. Aside from these aerodynamical moments it is possible that the condition of the runway may have a considerable effect on the directional stability of the rolling aircraft, for example, when the friction between the wheel and the runway is reduced due to so-called aqua planing or due to snow and ice covering the runway. The just described effects may also be caused by wet grass or mud when aircrafts are landing on dirt strips, auxiliary airfields or the like.

Electric control circuit means for preventing swerving or skidding motions of an aircraft are known and are used for aircraft equipped with wheel brakes. Such a system releases the brake pressure on the respective brake when there is a danger of blocking of the wheel or where there is a tendency that the differential r.p.m. between two wheels being braked increases beyond a permissible limit. Besides, methods are known to use the steering mechanisms necessary for taxiing on the ground or also controlling the aircraft during the roll out after touchdown to keep the aircraft rolling in the desired direction. This control may be accomplished either through a differential action on the left or right main brake or, in case the aircraft is equipped with means for steering the nose wheel or tail wheel, the pilot may take correctional steering actions with regard to such nose and/or tail wheel. Thus, U.S. Pat. No. 2,953,323 describes an example of a hydroelectric nose wheel steering system including foot pedals controlled by the pilot.

However, in aircrafts of all kinds it happens that after landing the perturbations described above lead to situations where neither the known anti-skid systems nor corrective actions by the pilot through wheel brakes, nose and/or tail wheel steering means or rudder can provide sufficient directional stability. As a result, swerving of the aircraft about the yaw axis, deviations from the runway and possibly heavy damage or even the total loss of an aircraft have occurred in the past.

OBJECTS OF THE INVENTION

In view of the foregoing, it is the aim of the invention to achieve the following objects, singly or in combination:

to provide a directional stabilization system for aircraft rolling on the ground which system eliminates the effects of disturbing yaw moments immediately without any need of intervention by the pilot;

to relieve the pilot from paying attention to the effect of the above mentioned perturbations while rolling out on a landing field;

to compensate for unpermissible differences in brake actions, for example, resulting from leaks in the brake pressure conduits or the like; and to combine an automatic nose wheel correction steering with a break pressure control to optimize the maintaining of a predetermined travel direction of an aircraft rolling on the ground.

SUMMARY OF THE INVENTION

According to the invention there is provided an automatic direction stabilization system for a rolling aircraft comprising sensor means which respond to directional deviations of the aircraft and comparator or transducer means connected to said sensor and to a reference control signal to produce an output control signal for the control of the steering mechanism which includes the brake means. The output control signal depends on the difference between the value measured by the sensor and a rated or predetermined value given by the steering system.

It is an advantage of the present invention that during all phases of ground movement of an aircraft the pilot is relieved from the concern with excursions caused by the above outlined disturbing moments. In addition, the system of the invention is capable of eliminating yaw moments which are caused by a one sided loss of braking power on one or the other side of the main landing gear. Such loss may be the result of leaks in the conduits or it may be the result of similar causes. The action of an automatic nose wheel steering combined wth the control of the brake pressure in accordance with the invention, provides an optimal maintaining of the predetermined taxiing or landing direction.

BRIEF FIGURE DESCRIPTION

In order that the invention may be clearly understood, it will now be described, by way of example, with reference to the accompanying drawings, wherein:

FIG. 1 illustrates a block diagram of an automatic direction stabilization system according to the invention; and FIG. 2 illustrates a modification of the system of FIG. 1 by influencing an additional selector switch means.

DETAILED DESCRIPTION OF PREFERRED EXAMPLE EMBODIMENTS

Figure 1:
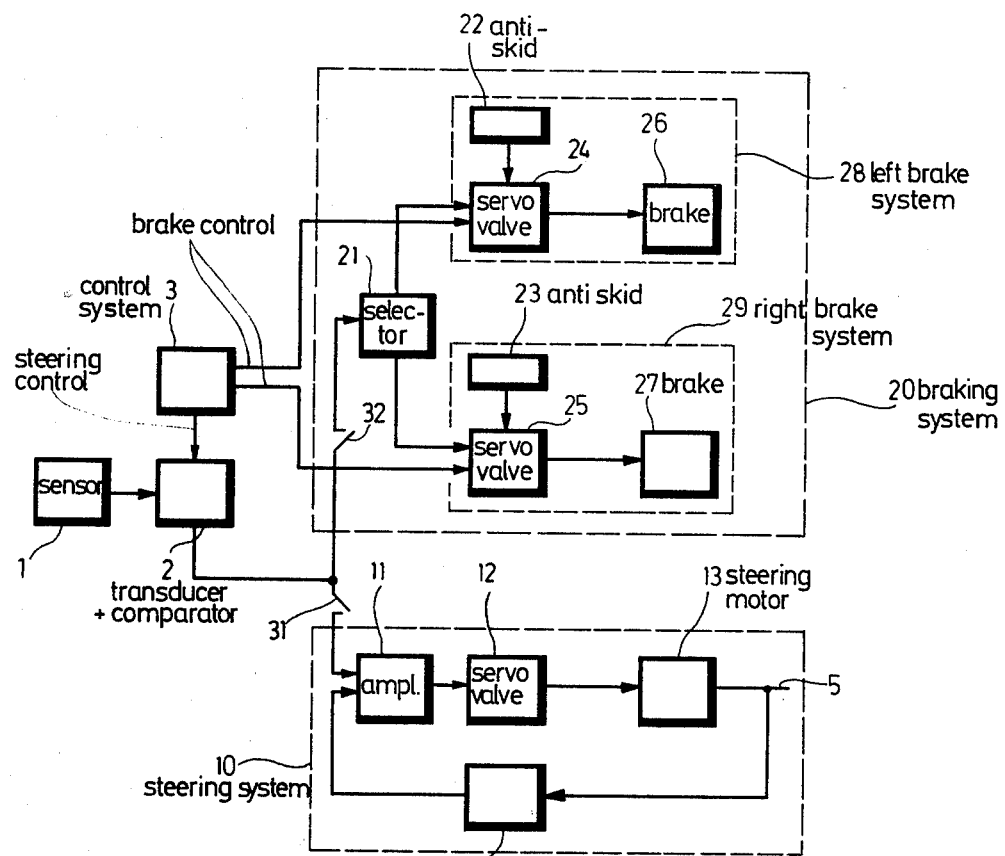

A conventional control system enables the pilot to provide brake control signals as well as steering control signals. Thus, the control system 3 may comprise, for example, a conventional steering wheel and/or combined steering and brake pedals which are operated or adjusted by the pilot for producing the desired rated brake control signal and the desired steering control signal. The steering control signal is supplied to one input of a comparator or transducer 2 which, if no disturbing moments about the yaw axis of the aircraft are present, transforms the steering control signal into a respective electrical signal and supplies it through an amplifier 11 to the steering system 10 of the aircraft. The output of the amplifier 11 is connected to a servo valve 12 which in turn is operatively connected to a steering motor 13 which provides a steering deflection 5 of the landing gear. For example, the nose wheel not shown may be controlled by the motor 13. A transducer 14 senses the actual position of the controlled wheel to provide a feedback to the amplifier 11 which would thus act as a differential amplifier. The nose wheel control just described is known from U.S. Pat. No.

2,953,323 mentioned above. If desired, the steering system 10 may be connected to the transducer 2 through a manually operable switch 31.

The output signal of the transducer or comparator 2 which may also be a differential amplifier is further connected to the braking system 20 comprising a left brake system 28 and a right brake system 29. Each brake system includes a conventional servo valve 24, 25, the brake proper 26, 27 and an anti-skid system 22, 23. A selector switch 21 is operatively arranged between the output of the transducer 2 and the control inputs of the servo valves 24 and 25, whereby the pilot has a choice in selecting which brake system should be applied. A further manual selector switch 32 may be arranged, again for selection of the type of control to be applied, either the steering system 10 through the switch 31 or the braking system 20 through the switch 32. The right and left brake systems 28, 29 are also of conventional designs. The selector switch 21 could be a simple polarity responsive electronic switch comprising, for example, a parallel circuit of two diodes arranged in opposite direction, whereby one diode operates in the reverse, nonconducting state while the other operates in the conducting state and vice versa depending on the polarity of the signal at the output of the transducer 2.

The sensor 1 may comprise a rate gyro which as such is also well known in the art and which responds to turning movements of the aircraft. Most aircrafts are equipped with such a gyro in any event and the gyro can be utilized for the present purposes. The above mentioned control system 3 is also of conventional construction including steering means and brake pedals.

The transducer 2 includes conventional means for converting the mechanical steering control signal into an electrical control signal. This may, for example, be accomplished by an electromagnetic transducer in which a plunger is movable in response to the mechanical steering control movement. An electrical resistor which is mechanically adjustable may also be used for converting the mechanical control signal into a respective electrical signal. Similarly, the instantaneous position of the gyro sensor 1 may be converted into an electrical signal by a respective transducer and the two electrical signals are then supplied into a comparator such as a differential amplifier to produce the output control signal for the steering system 10 and the brake system 20.

The present system operates as follows. When disturbances occur so that the aircraft performs movements about its yawing axis, the sensor 1, for example, a rate gyro provides the respective measured signal to the transducer 2 which compares the measured signals with the predetermined or rated control signal as determined by the pilot. The comparing takes place in response to the time duration during which a difference signal is present to produce the respective output signal which is supplied as a new steering control signal to the amplifier 11 and thus to the steering motor 13. Thus, a steering control signal is produced which counteracts thhe swerving or yawing motion of the aircraft as measured by the turn gyro 1.

The signal sensed by the sensor 1 and compared in the differential amplifier of the transducer 2 is also supplied to an electronic selector switch 21 forming part of the braking system 20 constructed conventionally as described above, for example, as the main brake system of the craft. The selector switch 21 which, as mentioned, may, for example, comprise two oppositely conducting diodes in a parallel circuit switches on either the left servo valve 24 or the right servo valve 25.

For example, if the servo valve 24 is switched on, the brake is activated and pressure to the left brake 26 is reduced for the duration of the presence of the control signal if the brake should have been activated at that time. Thus, the braking effect of the brake 26 is reduced for a length of time corresponding to the duration of the presence of the signal from the sensor 1. Since the control signal is corrected in accordance with the rated signals supplied by the pilot in accordance with the operation of the steering wheel or braking pedal, a differentiated actuation of the brake, for example, the left brake for negotiating a left curve, is not hindered. This advantage of the invention applies to all directional changes intended by the pilot because the instantaneous steering position of the steering wheel 3 will determine the respective rated value.

On the other hand, the system according to the invention prevents any external disturbing moments which are not intended by the pilot and which would otherwise cause a deviation of the aircraft from its intended course. For example, if the aircraft swerves to the left without the pilot having intended such a motion, such swerving motion will cause, according to the invention, a counter action against the swerving motion. Thus, if the brakes 26, 27 are activated or only the left brake 26 is activated, the brake pressure applied to the brake 26 is reduced to counteract such swerving motion. A similar, corrective action takes place with regard to a swerving motion to the right. As a result, although the pilot keeps actuating the brakes, in the given example, the right brake 27 will produce a moment which maintains the aircraft in the intended direction by counteracting the swerving movement to the left.

Incidentally, the servo valves 24 and 25 may be of the same kind as are used for the anti-skid purposes. And the valves normally present in anti-skid devices may be additionally utilized for the purposes of the present invention.

Figure 2:
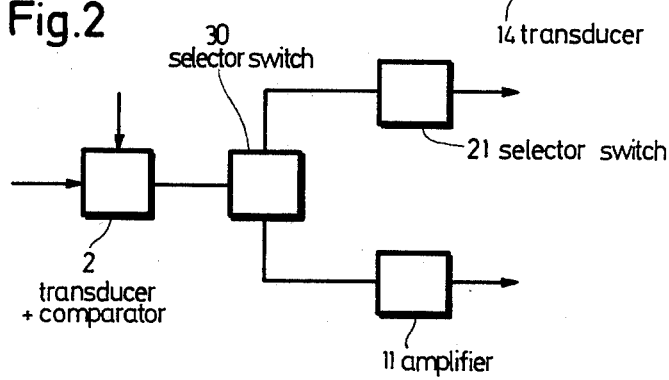

The arrangement of FIG. 2 employs a second selector switch 30 connected to the output of the transducer and comparator 2 and constructed as described above with reference to selector switch 21. Otherwise the embodiment of FIG. 2 is the same as that of FIG. 1 except that when the selector switch 30 is used, it would not be necessary to also use the switches 31 and 32. In any event, the switches enable the pilot to use only the wheel brake system 20 or only the wheel steering system 10 or both systems in combination if desired.

Although the invention has been described with reference to specific example embodiments, it will be appreciated, that it is intended, to cover all modifications and equivalents within the scope of the appended claims.

What is claimed is:

1. An automatic direction stabilization system for aircraft, especially for the landing run after touchdown, comprising sensor means (1) responding to changes in the travel direction of the aircraft to provide a measured signal, transducer and comparator means (2) operatively connected to said sensor means to receive said measured signal, control means (3) providing a rated control signal, said transducer and comparator means (2) being also operatively connected to said control means to receive said rated control signal in addition to said measured signal for comparing the measured signal and the rated control signal to produce a corrected difference control signal, said transducer and comparator means (2) having output means providing said corrected difference control signal, and steering performing means operatively connected to said output means of said transducer and comparator means (2) for responding to said difference control signal whereby a pilot caused steering action is automatically corrected to provide a steering action required for substantially eliminating the effects of disturbing yaw moments, said steering performing means comprising wheel steering means as well as left wheel brake means and right wheel brake means, amplifier means operatively interconnecting said transducer output means and said wheel steering means, selector switch means operatively connecting said transducer output means to said left or right wheel brake means, said selector switch means being responsive to the polarity sign of said difference control signal, whereby the braking action of the controlled wheel brake means is varied by varying the hydraulic brake pressure in the respective brake means in an increasing or decreasing manner without exceeding a given maximum brake pressure.

2. The system of claim 1, wherein said sensor means comprise a rate gyro.

3. The system of claim 1, wherein said difference control signal varies proportionally to the difference between the measured signal and the rated signal and proportionally to the duration of said measured signal and said rated signal.

4. The system of claim 1, wherein said wheel brake means comprise servo valve means for continuously reducing said hydraulic brake pressure.

5. The system of claim 4, wherein said servo valve means comprise anti-skid-valve means.

6. The system of claim 1, further comprising switch means operatively connected between said transducer output means and said wheel steering means so that the latter may be switched off and the difference control signal is fed only to the wheel brake means.

7. The system of claim 1, further comprising switch means operatively connected between said transducer output means and said wheel brake means so that the latter may be switched off and the difference control signal is fed only to the wheel steering means.

8. The system of claim 1, further comprising selector switch means operatively interposed between said transducer output means on the one hand and said wheel steering means and said wheel brake means on the other hand.

* * * * *

UNITED STATES PATENT AND TRADEMARK OFFICE
Certificate

Patent No. 4,221,350            Patented September 9, 1980

Werner Moser, Volker von Tein, Albert Dirlewanger,
Hans Offenbeck & Walter Stoeckle Application having been made by Werner Moser, Volker von Tein, Albert Dirlewanger, Hans Offenbeck and Walter Stoeckle, the inventors named in the patent above identified, and Messerschmitt-Boelkow-Blom, Gesellschaft MIT Beschraenkter, the assignee, for the issuance of a certificate under the provisions of Title 35, Section 256, of the United States Code, adding the name of Peter Klaus Raab as a joint inventor, and a showing and proof of facts satisfying the requirements of the said section having been submitted, it is this 17th day of August, 1982, certified that the name of the said Peter Klaus Raab is hereby added to the said patent as a joint inventor with the said Werner Moser, Volker von Tein, Albert Dirlewanger, Hans Offenbeck and Walter Stoeckle. -

Fred W. Sherling
*Associate Solicitor.*